United States Patent [19]

Speakman

[11] 3,945,695

[45] Mar. 23, 1976

[54] FATIGUE BUSHING ASSEMBLY

[75] Inventor: Eugene R. Speakman, Fullerton, Calif.

[73] Assignee: McDonnell Douglas Corporation, Long Beach, Calif.

[22] Filed: Mar. 31, 1975

[21] Appl. No.: 563,738

[52] U.S. Cl............................. 308/240; 308/121
[51] Int. Cl.² .......................................... F16C 1/24
[58] Field of Search............ 308/237 R, 237 A, 240, 308/78, 121, 123, 187, 168

[56] References Cited

UNITED STATES PATENTS

| | | | |
|---|---|---|---|
| 2,543,905 | 3/1951 | Firth | 308/187 |
| 2,853,346 | 9/1958 | Spangenberg | 308/121 |
| 3,070,408 | 12/1962 | Reuter | 308/78 |

Primary Examiner—M. H. Wood, Jr.
Assistant Examiner—Gene A. Church
Attorney, Agent, or Firm—George W. Finch; Walter J. Jason; Donald L. Royer

[57] ABSTRACT

A bushing for use in high strength materials where fatigue failure is a problem. The bushing is cylindrical and includes a circumferential lubrication groove on its inner surface while fillets and smooth transition surfaces are used to transition between the major cylindrical surfaces of the bushing and the housing. The bushing is pressed into the housing which is an interference fit therewith to reduce stress concentrations. Lubricant is provided to the circumferential lubrication groove by means of a passageway which may include a smooth wall annulus placed in a stepped hole in the housing and retained in the hole by a hollow screw which extends to the area of lubrication. A standard lubrication fitting is threaded into the annulus to provide means for connection to conventional lubricant supplying apparatus.

16 Claims, 2 Drawing Figures

FATIGUE BUSHING ASSEMBLY

BACKGROUND OF THE INVENTION

Throughout the aircraft industry, it is common to use high strength steel and other fatique sensitive materials in areas of high stress. Normally, bushings are used in the high strength housings as bearings for various other parts that must move with respect to the housing. These bushings, in combination with their required lubricant fitting installations, have caused many failures. In some areas, such as the landing gear and flap actuating linkage, these failures are potentially catastrophic. The bushings heretofore in use each have a sharp chamfer lower end, external lubricant ring and a sharply defined relief adjacent the positioning flange formed adjacent on one end thereof. The sharp edged chamfer tends to score and broach the housing hole into which the bushing is inserted which also causes a reduction in the fatigue life of the assembly. Also, the bushing flange relief, lubricant groove and chamfer reduce the housing bearing area which creates fatigue cracks due to high stress concentrations and galling from the grooves in contact with the housing. Due to the high stress concentrations, a relatively low interference fit is all that can be safely established between the bushing and its housing. Not only is this poor from a fatigue standpoint, but in smaller bushings the low interference can allow the bushings to rotate in the housing which further galls and scratches the housing, reducing its fatigue strength. In extreme instances, the bushings have rotated out of the housing.

Since the prior art bushing has an external lubricant groove, means such as holes must be drilled therethrough at selected locations to provide a passageway for the lubricant to pass to the inner surface of the housing. The groove and the lubricant holes which must extend inwardly therefrom make the prior art bushings relatively expensive to fabricate, and since the lubricant is in direct contact with the shaft running through the bushing only at the lubricant holes, shaft to bushing freeze-up due to lack of lubrication is a constant problem.

It has been traditional to supply lubricant to the lubricant groove by means of a hole with extends through the housing to the groove from some outside surface. At the outer extremity of the housing, a threaded hole has been used into which is inserted standard lubricant fittings which have tapered pipe threads. The tapered pipe threads create high localized stress concentrations in the straight threads of the housing when the fitting is installed and torqued to an adequate level. These standard fittings cause the most severe poblems in high strength aluminums that are notch-sensitive such as 7075-T6 aluminum and they also cause fabrication problems in high strength steels which cannot be threaded after heat treatment. Also, due to the normal geometry high strength parts, lubricant fittings must usually be installed in the short transverse grain direction which increases the chances of stress corrosion cracks.

The use of the prior art bushings and lubrication means have caused a large number of fatigue failures. Therefore, there has been a need for a new type bushing and an associated lubricant means therefor which do not adversely effect the fatigue strength of the high strength part in which they are installed.

BRIEF DESCRIPTION OF THE PRESENT INVENTION

The present invention is a bushing and lubrication fitting therefor which provides improved lubrication for the shaft passing through the bushing. The present invention, which can be installed as original equipment or retrofitted to existing installations also improves the fatigue strength of the housing in which the bushing is installed, when compared to the fatigue strength of a similar housing having a prior art bushing and lubrication means installed. The present bushing is generally cylindrical in shape which may or may not have a flange at one end thereof for positioning engagement with the side of the housing in which it is installed. The bushing is retained in the housing by means of a relatively high interference fit established therebetween when the bushing is pressed into the housing. The flange makes a smooth transition to the cylindrical portion of the bushing at one end thereof so that when the bushing is pressed into the housing there is no tendency to scratch, gall or broach portions of the housing. A circumferential lubrication groove is centrally located on the inner surface of the bushing. The groove provides 360° lubrication for the shaft or pivot passing through the bushing. Lubricant means such as grease is transmitted through the groove by means of a conventional grease fitting which is screwed into an annulus having a smooth outer wall. The annulus is retained in a hole in the housing by means of a hollow screw which extends from the annulus to the area of lubrication. Once the hollow screw, annulus and bushing are installed in the housing, the hollow screw is used as a jig to drill one hole through the bushing so that the lubricant can be transmitted to the aforementioned lubrication groove. This hole is the only sharp edge on the bushing and it faces the hollow screw so that undesirable stress concentrations are not created in the housing which might cause it to fail in fatigue. At the same time, the annulus and the screw can have sufficient interference and can be tightened so that the housing has relatively good fatigue strength in the area about them. If the housing is to be used in non-stress corrosion environment, a tapered sleeve within a tapered hole in the housing can be used with a grease fitting to provide lubrication with the grease hole down the tapered sleeve or the tapered hole itself being used as the jig to drill through the bushing.

It is therefore a primary object of the present invention to provide means for improving the fatigue strength of high strength housings having bushings therein.

It is another object of the present invention to provide a bushing which can be installed with a higher interference fit in a high strength housing than was previously possible without injury thereto.

Another object is to provide a bushing which provides improved lubrication for a shaft or a pivot mounted therein.

Another object is to provide lubrication means for a bushing which do not adversely affect the fatigue strength of the housing in which the bushing and the lubrication means are installed.

Another object is to provide means for utilizing standard grease fittings in notch-sensitive parts.

Another object is to reduce the cost of bushed housings while improving the fatigue strength thereof.

Another object is to provide economical lubricated bushings for use in stress corrosion environments and even more economical lubrication means for use with such bushings when the housing in which they are installed are used in non-stress corrosion environments.

Another object is to provide a bushing with a continuous outside diameter so that almost 100% contact between a housing and its bushing are maintained to improve the fatigue strength of the assembly.

Another object is to provide means for salvaging conventional grease fitting housings whose threads have been stripped.

These and other objects and advantages of the present invention will become apparent to those skilled in the art after considering the following detailed specification which covers preferred embodiments thereof in conjunction with the accompanying drawing wherein:

DETAILED DESCRIPTION OF THE SHOWN EMBODIMENT

Figure 1:
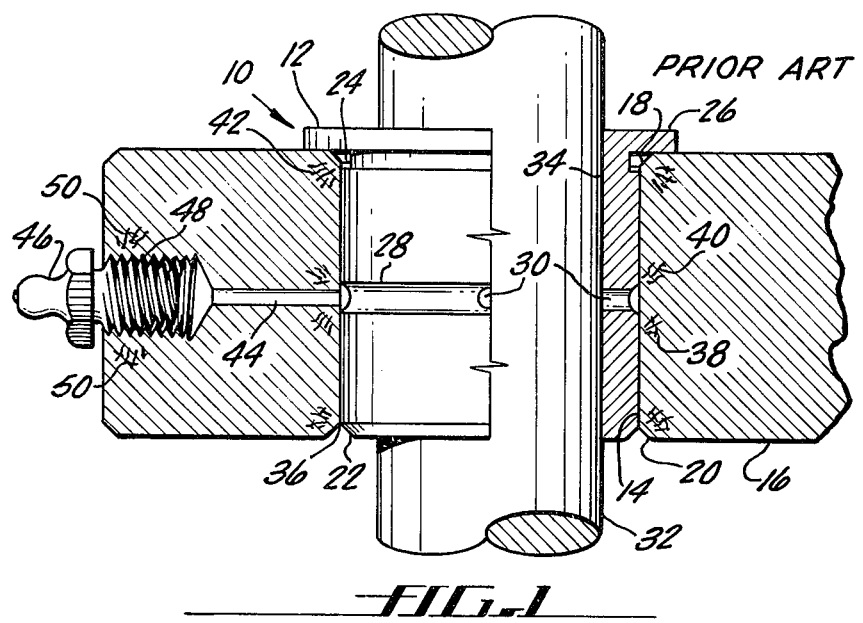
FIG. 1 is a partial cross-sectional view of a typical prior art bushing and lubrication means which form a lubricated bearing between a housing and a shaft passing therethrough.

Referring to the drawing, more particularly by reference numbers, nuber 10 in FIG. 1 refers to a prior art bushing assembly wherein a conventional bushing 12 is pressed into an annulus 14 in a high strength housing 16. As can be seen, the annulus 14 is of conventional construction having chamfered end corners 18 and 20. The bushing 12 has a similar chamfered lead-in 22 and an abrupt relief portion 24 under and adjacent to a positioning flange 26. In addition, the bushing includes an annular grease groove 28 cut in the outer surface thereof and holes 30 which extend from the groove 28 through the bushing 12 which apply grease at multiple positions to a shaft 32 which is supported by the inner bearing surface 34 of the bushing 12.

Bushings such as bushing 12 are sized to be a pressed fit in the housing 16 and the interference between the two holds the bushing 12 in place in the proper location as established by the positioning flange 26 or flush to surface if bushing is liner type which does not have a flange 26 and has a chamfered lead-in 22 at both ends of bushing. When the bushing 12 is pressed into the housing 16, the sharp edge 36 formed by the chamfered lead-in 22 tends to score and broach the annulus 14 which reduces the fatigue life of the housing 16. In addition, the sharp edge 36 as well as the sharp corners 38 and 40 of the grease groove 28 and the sharp edge 42 of the relief 24 create areas of high stress concentration from fatigue cracks tend to run, as shown in FIG. 1. Therefore, it has been desired to improve conventional bushings so that they do not adversely effect the fatigue strength of the housing 16. In addition, grease is provided to the groove 28 by means of an open hole 44 and a conventional pipe threaded grease fitting 46 which is threaded directly into the housing 16. This is disadvantageous since many high strength materials from which typical housings 16 are constructed are notch-sensitive and either cannot or should not be threaded. In addition, the pipe threads 48 on the grease fitting 46 are tapered in the conventional manner and the taper causes extreme stress concentrations to accumulate as shown at positions 50 in the housing which further degrade the fatigue strength capabilities of the housing 16.

Figure 2:
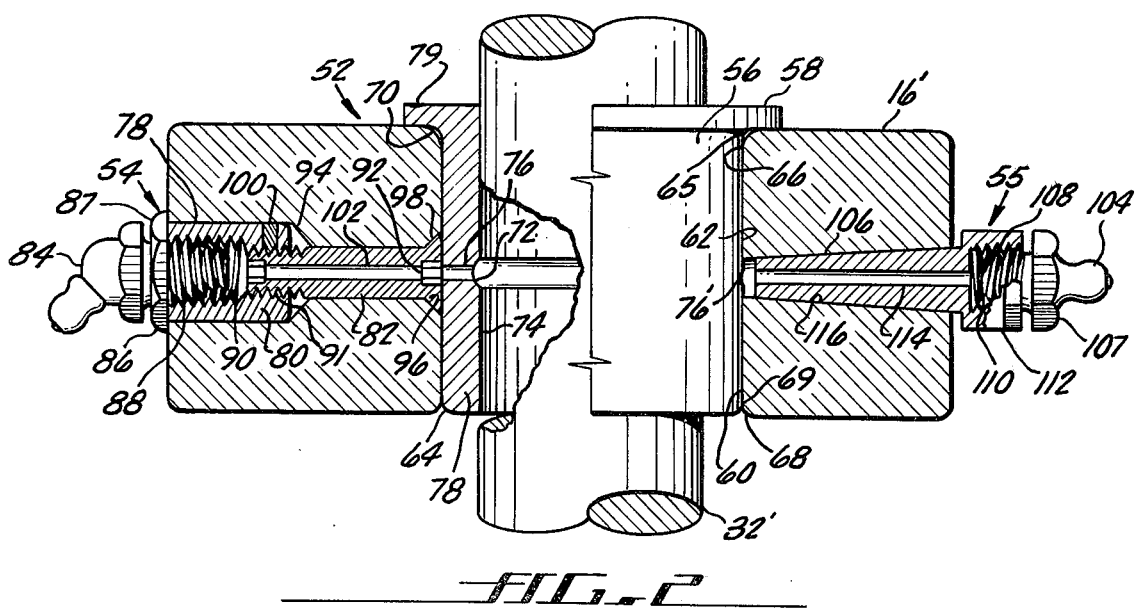
FIG. 2 is a partial cross-sectional view of a bushing constructed according to the present invention and alternate lubrication means therefor.

The present invention 52 is shown in FIG. 2 including two means 54 and 55, for applying lubricant thereto. Normally only one lubricant means is provided, the choice depending upon several factors to be explained hereinafter.

The primary portion of the inventive assembly 52 is the bushing 56. The bushing 56 may have a positioning flange 58 which positions the bushing 56 when it is pressed into an annulus 60 in the housing 16'. The bushing 56 also has an outer surface 62 which is normally cylindrical and mates with the annulus 60. As can be seen, the outer surface 62, unlike the conventional bushing 12, has no sharp edges which can broach, gouge, or otherwise injure the annulus 60 when the bushing 56 is pressed therein. Therefore, the interference fit between the bushing 56 and the annulus 60 can be higher which improves the fatigue life of the housing 16' at the same time assuring, especially in small diameters, that the bushing 56 will not work its way out of the housing 16' when two or more bushings are line reamed in a clevis or when the assembly is in use. A gently radiused lead-in surface 64 if provided on the bushing 56. It is also preferable that a radiused lead-in surface 65 is provided at the upper end 66 of the annulus 60 so the above mentioned tendency to broach the annulus 60 does not occur during bushing press in. The surface 65, as well as the similar surface 68, at the lower end 69 of the annulus 60 can be machined into the housing or it preferably can be radius coined which is a cold forming process applied to the surface which improves the fatigue life of the housing 16'. The intersection 70 between the flange 58 and the outer surface 62 is preferably curved to nearly match the surface 66 as shown. It should be noticed that just about the entire area of the outer surface 62 of the bushing 56 is in contact with the annulus 60 as opposed to the situation existant in the prior art shown in FIG. 1 so that the pressure between the bushing 56 and the housing 16' is reduced through the use of a greater contact area.

The bushing 56 provides lubricant to the shaft 32' running therein by means of an internal grease groove 72 which runs circumferentially about the inner surface 74 of the bushing 56. Lubricant can be provided to the grease groove 72 by the lubricant means 54 and 55 and by a hole 76 which is drilled through the wall 78 of the bushing 56 once it is in place within the housing 16'. The lubricant means 54 or 55 provide a jig to position the hole 76 so that it is in general alignment therewith. Indicia means such as the groove 79 can be included on the flange 58 to indicate the radial location of the hole 76 so a quick inspection can detect rotation of the bushing 56. The indicia means also can be used to assure alignment of the hole 76 with the lubricant means 54 or 55 during reassembly.

The means 54 include a smooth wall annulus 78 placed in a stepped hole 80 in the housing 16'. The annulus 78 is retained in the hole 80 by means of a hollow screw 82 which extends from the annulus 78 to the hole 76 in the bushing 56. The smooth wall annulus 78 is internally threaded to accept a conventional grease fitting 84 which happens to be an angle grease fitting. Angle grease fittings 84 have proved difficult in the past since their use is usually dictated by the interference of other parts surrounding them and it is desired that they always point the same direction. In the present case, suitable wrench engagement means 86 are provided on the portion 87 of the smooth wall annulus 78 which extends out of the hole 80 to prevent rotation thereof. Therefore, the fitting 84 can be screwed into the annulus 78 with its pipe threads 88 engaging internal threads 90 in the annulus 78. Once the fitting 84 is properly tightened within the annulus 78, the annulus 78 is rotated and retained in proper rotative position through the use of a wrench and the means 86. The screw 82 is then threadably engaged with suitable threads 92 within the annulus 78 to maintain the annulus 78 in the desired rotative position. The screw 82 can have tool engagement means 92 and 94 such as slots, hexagonal depressions, crosses or other means at both ends so that the screw 82 can be tightened from either end. Normally, the screw 82 will be the flush shear head type so that its head 96 is submerged in a countersunk portion 98 in the housing 16'. A shear head 96 is used since there is little strain on the screw 82 and shear heads are smaller than tension heads for the same size bolt. Self locking means 100 such as a nylon insert, a crimped portion of the threads 92 or other means are normally provided in the annulus 78 so that the screw 82 does not release the annulus 78 under normal working conditions.

As can be seen, the screw 82 includes a passageway 102 through which the grease can pass from the fitting 84 through the hole 76 to the grease groove 72. This passageway 102 also acts as a drill jig for drilling the hole 76 once the bushing is installed which of course occurs after the lubrication means 54 are installed.

The other lubricant means 55 shown are special purpose means for use in non-stress corrosion environments. Included is a relatively conventional grease fitting nipple 104 which can be machined integral with a tapered portion 106, a feature that also can be included with means 54, or it can be the conventional grease fitting 107 as shown installed with its tapered threads 108 in engagement with similar threads 110 in an extended housing portion 112 provided on the end of the tapered extension 106. A passageway 114 is provided through the extension 106 through which grease can be provided to a hole 76' in the bushing 56 drilled using the passageway 114 or the tapered hole 116 in which the extension 106 is driven and retained as a jig.

Thus there has been shown and described novel fatigue bushing assemblies which fulfill all the objects and advantages sought therefor. Many changes, alterations, other uses and applications of the subject assemblies will become apparent to those skilled in the art after considering this specification and the accompanying drawing. All such changes, modifications, variations and other uses and applications which do not depart from the spirit and scope of this invention are deemed to be covered by the invention which is limited only by the claims which follow:

I claim:

1. A bushing assembly for use in high strength housings where fatigue failure is a problem, the bushing assembly including:
    a bushing having inner and outer surfaces of revolution with a wall therebetween and first and second end portions, said inner surface having a circumferential lubrication groove defined therein between said first and second end portions, said first end portion having a smooth radiused corner portion at the intersection thereof with said outer surface and said wall defining a lubricant passageway from said lubrication groove through said outer surface for transmission of lubricant to said lubrication groove.

2. The bushing assembly defined in claim 1 wherein said bushing second end portion includes a radially outwardly extending positioning flange and a smooth radiused corner portion at the intersection thereof with said outer surface.

3. The bushing assembly defined in claim 1 including:
    a housing having first and second side surfaces, a surface of revolution therebetween defining a hole therein and an end surface, said bushing being located in said hole with its outer surface in interference fit with said housing surface of revolution, said housing having smooth radiused corners at the intersections between said first and second side surfaces and said surface of revolution.

4. The bushing assembly defined in claim 2 including:
    a housing having first and second side surfaces a surface of revolution therebetween defining a hole therein and an end surface, said bushing being located in said hole with its outer surface in interference fit with said housing surface of revolution, said housing having smooth radiused corners at the intersections between said first and second side surfaces and said surface of revolution, said positioning flange abutting said second side surface of said housing.

5. The bushing assembly defined in claim 3 including lubricant means extending between said housing end surface and said housing hole in general alignment with said lubricant passageway in said bushing, said lubricant means including:
    a grease fitting having threaded connection means and torque applying means, an annulus having a relatively smooth outer wall, torque applying means and threaded connection means therein; and
    a hollow screw having a head end and an opposite threaded end, said grease fitting being threadably connected to said annulus by said threaded connection means and said annulus being retained in said housing by said screw which is threadably connected thereto.

6. The bushing assembly defined in claim 5 wherein said housing has a countersunk surface and a stepped cylindrical surface aligned therewith which defines a passageway which extends between said housing end surface and said housing hole, said hollow screw having a countersink head and being located in said housing passageway with its head end adjacent said bushing lubricant passageway.

7. The bushing assembly defined in claim 1 including lubricant means positioned in general alignment with said lubricant passageway in said bushing, said lubricant means including:
    a grease fitting having a grease nipple on one end thereof, threads on the other end thereof and torque application means therebetween;
    an annulus having torque application means and threads therein; and
    a hollow screw having a head end with torque application means adjacent said bushing lubricant passageway and an opposite threaded end, whereby said grease fitting and said hollow screw are threadably connected to said annulus to form a pathway for lubricant from said nipple to said bushing lubricant passageway.

8. The bushing assembly defined in claim 7 wherein said hollow screw also has torque application means at its threaded end, said annulus having thread locking means for preventing undesired relative rotation between said annulus and said hollow screw.

9. The bushing assembly defined in claim 3 including lubricant means extending between said housing end surface and said housing hole in general alignment with said lubricant passageway in said bushing, said lubricant means including:
   a tapered hollow portion forming one end thereof located adjacent said bushing lubricant passageway;
   a grease nipple forming the opposite end thereof; and
   a pathway defined therethrough for passage of lubricant from said grease nipple to said bushing lubricant passageway, said husing having:
   a tapered surface which extends inwardly from said end surface thereof, said tapered hollow portion of said lubricant means being pressed into tight engagement with said housing tapered surface.

10. The bushing assembly defined in claim 9 wherein said lubricant means include torque application means, a internal threaded surface, and a grease fitting having said grease nipple, said grease fitting being threadably engaged to said internal threaded surface.

11. The bushing assembly defined in claim 1 including lubricant means positioned in general alignment with said lubricant passageway in said bushing, said lubricant means including:
   an annulus having a lubricant fitting on one end thereof, threads on the other end thereof and torque application means therebetween, said annulus defining a lubricant passageway between said fitting and said threaded end; and
   a hollow screw having a head end with torque application means adjacent said bushing lubricant passageway and a opposite threaded end, whereby said hollow screw is threadably connected to said annulus to form a pathway for lubricant from said fitting to said bushing lubricant passageway.

12. A bushing assembly for use in high strength housings where fatigue failure is a problem, the bushing assembly including:
   a bushing having inner and outer surfaces of revolution with a wall therebetween and lubricant transmission means in said wall for transmitting the lubricant through said wall from said outer surface to said inner surface; and
   lubricant means in general alignment with said lubricant transmission means, said lubricant means including an annulus having a lubricant fitting on one end thereof, threaded connection means on the other end thereof and torque application means therebetween, said annulus defining a lubricant passageway between said fitting and said threaded connection means, and a hollow screw having a head end with torque application means adjacent said lubricant transmission means and an opposite threaded end, whereby said hollow screw is threadably connected to said annulus to form a pathway for the lubricant from said lubricant fitting to said lubricant transmission means.

13. The bushing assembly defined in claim 12 wherein said annulus lubricant fitting has a lubricant nipple on one end thereof and threads on the opposite end thereof, said annulus having threads for threadable attachment to said lubricant fitting.

14. The bushing assembly defined in claim 13 wherein said hollow screw also has torque application means at its threaded end.

15. The bushing assembly defined in claim 14 wherein said bushing inner surface has a circumferential lubrication groove defined therein and said lubricant transmission means is formed by a lubricant passageway defined through said wall from said lubrication groove through said outer surface for transmission of lubricant.

16. The bushing assembly defined in claim 15 wherein said bushing has first and second end portions, said circumferential lubrication groove being positioned in said inner surface between said first and second end portions, said first end portion having a smooth radius corner portion at the intersection thereof with said outer surface.

* * * * *